United States Patent
Gough (10) Patent No.: US 7,597,051 B2
(45) Date of Patent: Oct. 6, 2009

(54) INTEGRATED IMPACT PROTECTING SYSTEM

(75) Inventor: Glenn Gough, Sacramento, CA (US)

(73) Assignee: Siemens Transportation Systems, Inc., Sacramento, CA (US)

( * ) Notice: Subject to any disclaimer, the term of this patent is extended or adjusted under 35 U.S.C. 154(b) by 214 days.

(21) Appl. No.: 10/572,124

(22) PCT Filed: Sep. 16, 2004

(86) PCT No.: PCT/US2004/030310

§ 371 (c)(1),
(2), (4) Date: Oct. 17, 2006

(87) PCT Pub. No.: WO2005/028275

PCT Pub. Date: Mar. 31, 2005

(65) Prior Publication Data

US 2007/0186802 A1     Aug. 16, 2007

Related U.S. Application Data

(60) Provisional application No. 60/504,091, filed on Sep. 19, 2003.

(51) Int. Cl.
*B61D 15/06* (2006.01)
*B61G 1/10* (2006.01)
(52) U.S. Cl. ..................... 105/392.5; 213/74
(58) Field of Classification Search ............... 105/392.5; 213/74, 75 R
See application file for complete search history.

(56) References Cited

U.S. PATENT DOCUMENTS 5,462,144 A   10/1995   Guardiola et al.

(Continued)

FOREIGN PATENT DOCUMENTS

EP        0 802 100 A   10/1997

(Continued)

OTHER PUBLICATIONS

Gabler et al., "980908—The Aggressivity of Light Trucks and Vans in Traffic Crashes", *U.S. National Highway Traffic Safety Administration*, Sep. 15, 2004, pp. 1-15.

(Continued)

*Primary Examiner*—S. Joseph Morano
*Assistant Examiner*—Jason C Smith
(74) *Attorney, Agent, or Firm*—Michael J. Wallace (57) ABSTRACT

An integrated impact energy management system is provided for managing a wide range of impact energies exerted upon impact of a vehicle with an object. The system includes a cover structure adapted for attachment to a vehicle, the cover structure being designed to deform elastically when impact energy is exerted thereon, and having an inner surface with a preformed detent. The system also includes a folding coupler mechanism including a shank having a proximate end adapted to attach to the vehicle, and a longitudinal axis that extends from the proximate end to a distal end in a direction substantially parallel to a longitudinal axis of the vehicle. The shank has an energy absorption element for absorbing energy caused by compressive forces exerted along the longitudinal axis of the shank. The folding coupler mechanism also includes a coupling head pivotally attached to the distal end of the shank for pivoting between an extended position and a stowed position. The distal end of the shank moves into the preformed detent in the cover structure after consumption of the energy absorbing capacity of the cover structure when the coupling head is in the stowed position.

20 Claims, 7 Drawing Sheets

U.S. PATENT DOCUMENTS

| | | | |
|---|---|---|---|
| 5,579,699 A | 12/1996 | Dannawi et al. | |
| 5,660,116 A | 8/1997 | Dannawi et al. | |
| 5,715,757 A * | 2/1998 | Dannawi et al. | 105/392.5 |
| 5,762,392 A | 6/1998 | Suga | |
| 5,934,418 A | 8/1999 | Wirth | |
| 6,042,176 A | 3/2000 | Ikeda et al. | |
| 6,079,732 A | 6/2000 | Nakajima et al. | |
| 6,158,356 A * | 12/2000 | Hachet et al. | 105/392.5 |
| 6,167,815 B1 * | 1/2001 | Werner et al. | 105/392.5 |
| 6,173,943 B1 | 1/2001 | Welch et al. | |
| 6,267,436 B1 | 7/2001 | Takahara | |
| 6,270,131 B1 | 8/2001 | Martinez et al. | |
| 6,328,145 B1 | 12/2001 | Villemin et al. | |
| 6,334,518 B1 | 1/2002 | Garnweidner et al. | |
| 6,364,359 B1 | 4/2002 | Dietrich | |
| 6,393,999 B1 * | 5/2002 | Schneider | 105/392.5 |
| 6,397,131 B1 | 5/2002 | Busch et al. | |
| 6,523,873 B1 | 2/2003 | Summe et al. | |
| 6,561,105 B2 * | 5/2003 | Godin et al. | 105/396 |
| 6,619,491 B2 * | 9/2003 | Payne et al. | 213/221 |
| 6,685,040 B2 * | 2/2004 | Heinisch et al. | 213/221 |
| 6,688,237 B2 * | 2/2004 | Back et al. | 105/392.5 |
| 6,712,007 B2 * | 3/2004 | Yamamoto et al. | 105/392.5 |
| 6,845,874 B2 * | 1/2005 | Payne et al. | 213/221 |
| 6,951,176 B2 * | 10/2005 | Taguchi | 105/392.5 |
| 2002/0005142 A1 * | 1/2002 | Demarquilly et al. | 105/392.5 |
| 2005/0121404 A1 * | 6/2005 | Sprave | 213/75 R |
| 2005/0145591 A1 * | 7/2005 | Mattschull et al. | 213/75 R |
| 2006/0249470 A1 * | 11/2006 | Sprave | 213/75 R |
| 2007/0186802 A1 * | 8/2007 | Gough | 105/392.5 |
| 2007/0261591 A1 * | 11/2007 | Bravo et al. | 105/392.5 |
| 2007/0261592 A1 * | 11/2007 | Mochida et al. | 105/392.5 |

FOREIGN PATENT DOCUMENTS

EP          0936 118 A          8/1998

OTHER PUBLICATIONS

SAB WABCO GmbH, "Coupler-System for Central Phoenix / East Valley Light Rail Transit Project, General Description", Jan. 24, 2003, pp. 1-40.

Korve, et al., "Light Rail Service: Pedestrian and Vehicular Safety", *Transit Cooperative Research Program*, Report 69, 2001, pp. 1-150.

\* cited by examiner

INTEGRATED IMPACT PROTECTING SYSTEM

PRIOR APPLICATION

This application claims priority from International PCT Application No. US2004/030310, filed 16 Sep. 2004 which claimed the benefit of U.S. Provisional Application Ser. No. 60/504,091, filed Sep. 19, 2003, the disclosures of which are incorporated by reference herein in their entireties.

FIELD OF THE INVENTION

The present invention relates generally to an apparatus for absorbing energy exerted upon impact of a vehicle with an object. More particularly, the invention relates to an integrated impact energy absorption system for use with a light rail vehicle.

BACKGROUND

In the past, designers of light rail vehicles, and the authorities approving the safety of such vehicles, have concentrated on protecting the passengers on board the vehicle in the event of a collision. Less attention has been paid to the safety of pedestrians, cyclists, or passengers in automobiles or trucks that might be impacted by a light rail vehicle. Most light rail vehicles in service today have a non-retractable coupler at each end, which acts as an energy absorption device in the event of a collision between light rail vehicles, but as a battering ram in the event of a collision with an automobile or truck.

Some more recent designs of light rail vehicles use retractable couplers, which can be folded away when not in use. This removes the battering ram effect, but does nothing else to mitigate the consequences of a collision with vehicles and objects smaller than another light rail vehicle. Some authorities, mindful of the effective loss of energy absorbing capability when the coupler is folded away, have required energy-absorbing bumpers to be fitted onto the light rail vehicles. However, such bumpers have been specified as high energy-absorption devices designed for a collision between two light rail, vehicles. Such high energy devices would do little or nothing to help prevent injuries to pedestrians, cyclists, and automobile or truck passengers because of the high forces required to activate them. Some light rail vehicles use a plurality of impact energy absorption elements in conjunction with retractable couplers. In such systems, it is known to combine an energy absorption element with the mechanism holding the retractable coupler. It is also known to use a bumper to cover the retractable coupler while it is folded away, and when not in use. In such systems, the bumper and the energy absorption element in the retractable coupler mechanism provide a certain measure of safety for lower energy collisions. However, such systems have not been designed optimally to prevent injuries to pedestrians, cyclists, and automobile or truck passengers.

In complete contrast with the aims of prior art energy-absorbing systems, accident statistics show that the vast majority of collisions involving a light rail vehicle do not involve a second light rail vehicle. An automobile or truck was involved in 62% of cases reported to the Transit Cooperative Research Program, and pedestrians and cyclists were involved in 38% of all such cases. Slightly more pedestrians and cyclists than occupants of motor vehicles were killed. Collisions between two light rail vehicles are so rare that they do not even figure in the statistics. While rail to rail accidents do happen, such accidents tend to occur at relatively low speeds in the maintenance facility, when no passengers are on board.

Figure 1:
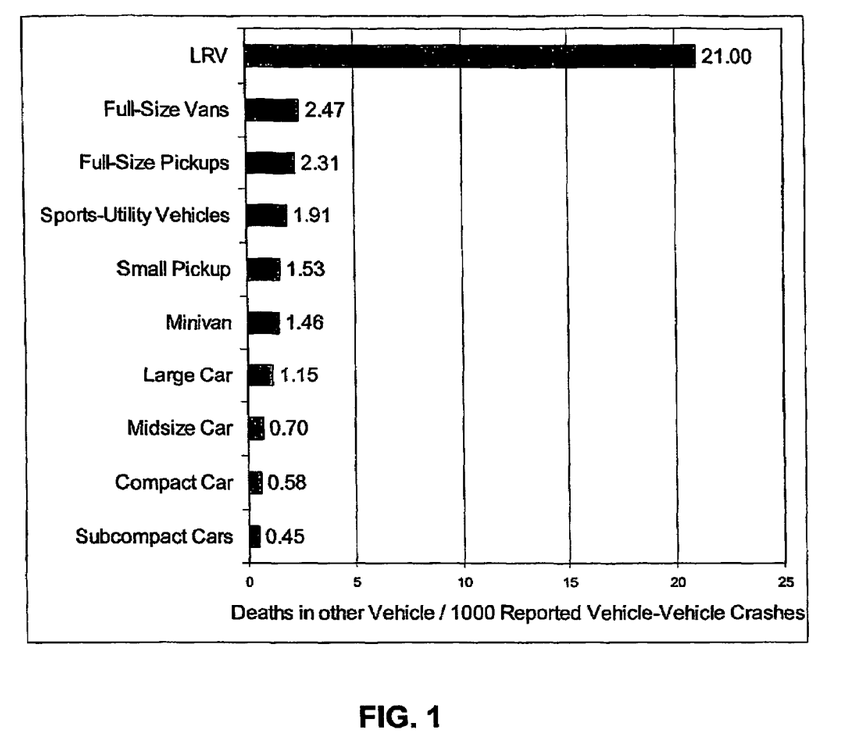
FIG. 1 is a table diagram showing aggressivity metrics for vehicle-vehicle crashes as reported in a study providing background to the present invention.

In order to quantify the relationship between motor vehicle design and collision fatalities, the society of automotive engineers ("SAE") has defined an "aggressivity index," depicted in FIG. 1, which indicates the ratio of driver fatalities in collision partners to the number of crashes of subject vehicle. The SAE study shows that the most aggressive vehicles were full size vans with a rating of 2.47, followed by full-sized pickups with a rating of 2.31. Midsize cars had a rating of 0.70. The inventors of the present invention believe that the results of this study, and similar logic can be applied to understand collisions involving light rail vehicles. Based upon data from the Transit Cooperative Research Program, light rail vehicles have an aggressivity index of 21.0. In other words, light rail vehicles are 8.5 times more aggressive than the most aggressive motor vehicle in the SAE study.

Hence there is a need to equip light rail vehicles with an impact energy management system that will provide improved safety in all accident scenarios, from collisions involving a pedestrian to those involving a heavy vehicle, such as another light rail vehicle. Given such a wide range of different accident scenarios, the impact energy management system must be able to efficiently absorb a wide range of impact energies. Ultimately, such a system must be able to provide improved safety in all accident scenarios, especially the most likely ones involving pedestrians and cyclists.

SUMMARY

The present invention provides an integrated impact energy management system for managing a wide range of impact energies that may be exerted upon impact of a vehicle with an object. The system includes a cover structure adapted for attachment to a vehicle, the cover structure being designed to deform elastically when impact energy is exerted thereon, and having an inner surface designed to face the vehicle. The inner surface has a preformed detent. The system also includes a folding coupler mechanism including a shank having a proximate end adapted to attach to the vehicle, and a longitudinal axis that extends from the proximate end to a distal end in a direction substantially parallel to a longitudinal axis of the vehicle. The shank has an energy absorption element for absorbing energy caused by compressive forces exerted along the longitudinal axis of the shank. The folding coupler mechanism also includes a coupling head pivotally attached to the distal end of the shank for pivoting between an extended position and a stowed position. Upon impact, when the coupling head is in the stowed position, the distal end of the shank moves into the preformed detent in the cover structure upon consumption of the energy absorbing capacity of the cover structure.

In different embodiments of the invention, the energy absorption element of the shank may be regenerative or non-regenerative. In accordance with another aspect, the cover structure includes an elastic covering having a low modulus of elasticity. The cover structure may also include a foam mat.

The attachment of the cover structure to the front portion of the vehicle may be a direct attachment or an indirect attachment. In one embodiment, the impact energy management system includes a pair of low force energy absorption elements disposed between the cover structure and the vehicle. In this embodiment, the distal end of the shank does not move into the preformed detent in the cover structure until substantially all of the energy absorbing capacities of the cover structure and the low force energy absorption elements are absorbed.

The impact energy management system may be mounted on a light rail vehicle having a cab structure proximate one end of the vehicle. In one embodiment, the cab structure is designed to collapse upon exertion of a sufficient impact force. In another embodiment, the light rail vehicle includes a rigid passenger area structure. This and other features, aspects and advantages of the present invention will become better understood from the description herein, appended claims, and accompanying drawings as hereafter described.

BRIEF DESCRIPTION OF THE DRAWINGS

The accompanying drawings which, are incorporated in and constitute a part of this specification, illustrate several embodiments of the invention and together with the description, serve to explain the principles of the invention. Wherever convenient, the same reference numbers will be used throughout the drawings to refer to the same or like elements.

DETAILED DESCRIPTION

The present invention is based, in part, on the observation that a plurality of impact energy zones can be balanced and implemented in a single integrated impact energy management system to manage a wide range of impact energies exerted upon impact of a vehicle with an object. Accordingly, the present invention provides an improved integrated energy management system having a plurality of impact energy zones. The system provides increased safety in a wide range of collisions involving anything from a pedestrian to a heavy vehicle. In one embodiment, the integrated energy management system is designed for use with a light rail vehicle. When equipped with an energy management system according to the present invention, a light rail vehicle becomes a much less aggressive vehicle, thereby providing improved safety in all accident scenarios, especially the most likely ones involving pedestrians, cyclists and automobiles.

Figure 2:
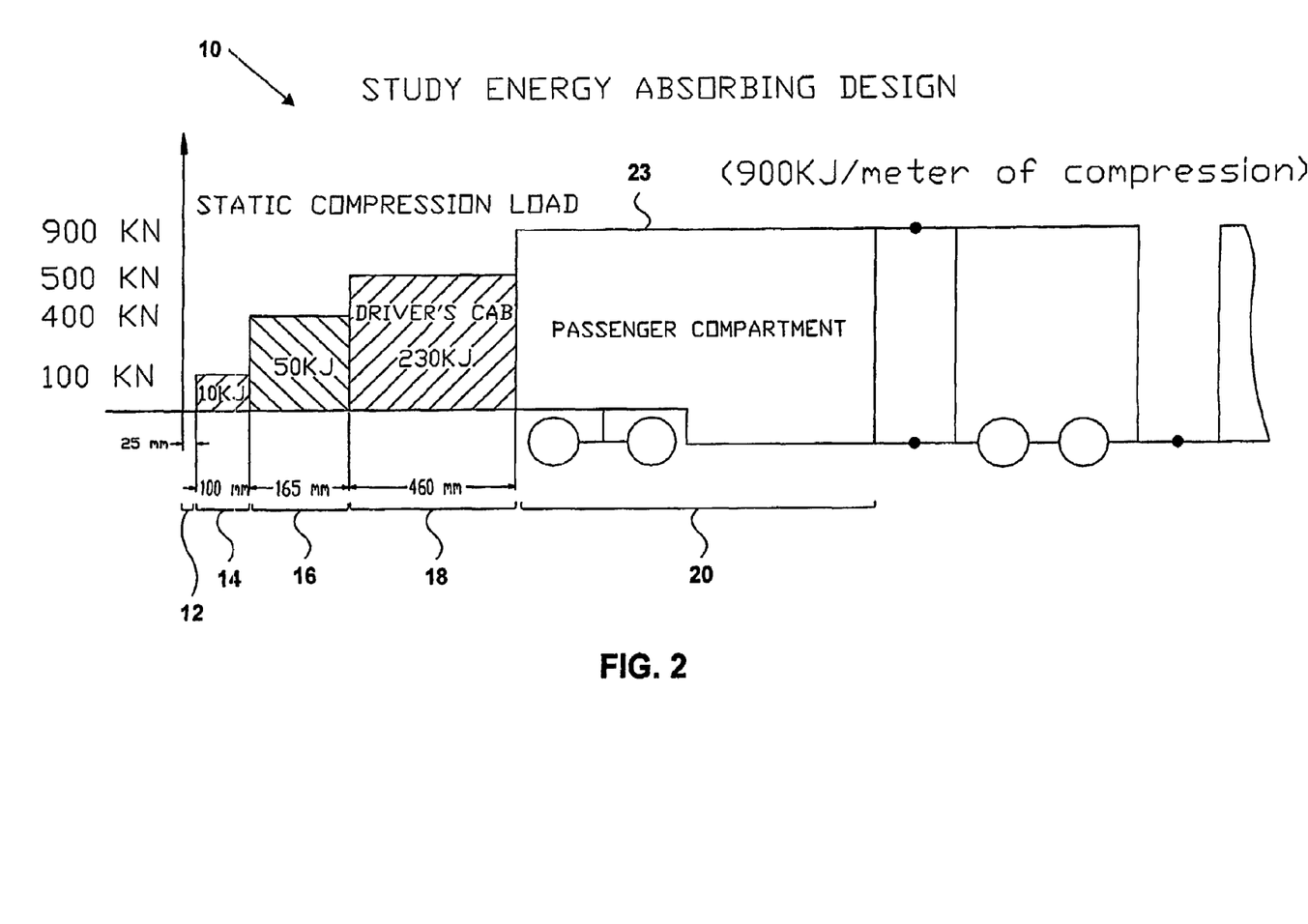
FIG. 2 is a table block diagram showing a system in accordance with the present invention for managing a wide range of impact energies exerted upon impact of a vehicle with an object, the system including five impact energy absorption zones in the depicted embodiment.

FIG. 2 shows a table block diagram of a system 10 in accordance with the present invention for managing a wide range of impact energies exerted upon impact of a vehicle 23 with an object, the system including five impact energy absorption zones in the depicted embodiment. Each of the five impact energy absorption zones is designed for a particular range within the overall impact energy spectrum managed by the system. The table block diagram of FIG. 2 indicates the impact force, expressed in kilo-Newtons (KN), associated with each zone. FIG. 2 also indicates the distance of deflection or collapse, as well as the kinetic energy expressed in kilojoules, associated with each of the five zones. A first impact energy absorption zone 12 is designed to reduce pedestrian collision forces, specifically to present crushing of the pedestrian. In the embodiment depicted in FIG. 2, the distance of deflection or collapse associated with the first impact energy absorption zone 12 is 25 mm.

The second impact energy absorption zone 14 is designed to mitigate the consequences of collisions with automobiles, which can result in kinetic energy of 10 KJ and impact forces of 100 KN. In an embodiment, the distance of deflection or collapse associated with the second impact energy absorption zone 14 is 100 mm. The third zone 16 is designed to mitigate the consequences of collisions between the light rail vehicle and a heavy truck or another light rail vehicle, which can result in kinetic energy of 50 KJ and impact forces of 400 KN.

A fourth zone 18 is designed to engage in the event of a rail vehicle to rail vehicle collision severe enough to expend all of the impact energy absorbing capacity of the first, second and third zones 12, 14 and 16. In one embodiment, this fourth impact energy absorption zone is implemented as a collapsible cab structure designed to collapse over a distance of 460 mm. A rail vehicle to rail vehicle can result in kinetic energy of 230 KJ and impact forces of 500 KN.

A fifth impact energy absorption zone 20 is designed to protect passengers in the passenger area of the vehicle. In one embodiment, the fifth zone 20 is designed to withstand end loads of twice the empty weight of the vehicle (e.g., 40-50 tons), corresponding to 900 kilojoules/meter of compression.

Figure 3A:
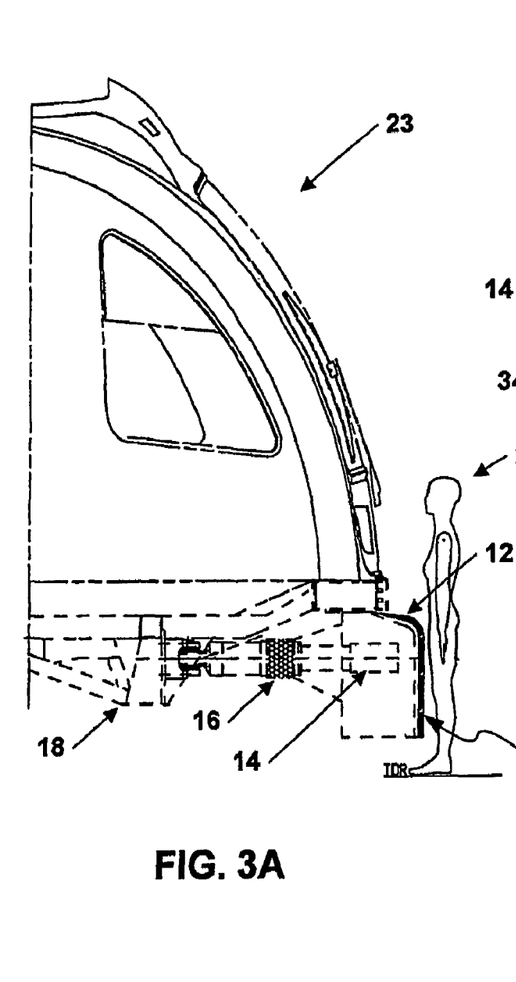
FIGS. 3A and 3B are cross sectional views of a first impact energy absorption zone of the system of FIG. 2 in accordance with one embodiment of the present invention.

FIG. 3A shows a side elevation cross-sectional view of one embodiment of the integrated impact energy management system 10 attached to a vehicle 23 immediately before collision with a pedestrian. In the depicted embodiment, the system 10 is mounted to a light rail vehicle. Also in this embodiment, the first impact zone 12 is implemented by a cover structure 30, and the second zone 12 is formed by a pair of low force energy absorption elements 34. As will be explained below, the third zone 16 is comprised of a folding coupler mechanism having an energy absorption element, and the fourth zone 18 takes the form of a collapsible cab structure of the vehicle. In the depicted embodiment, the cover structure 30 in the first zone is designed for minimizing the consequences of collisions with pedestrians equal or greater in stature than a 5th percentile female 20, below their center of gravity, specifically in order to prevent pedestrians from falling beneath the vehicle.

Figure 3B:
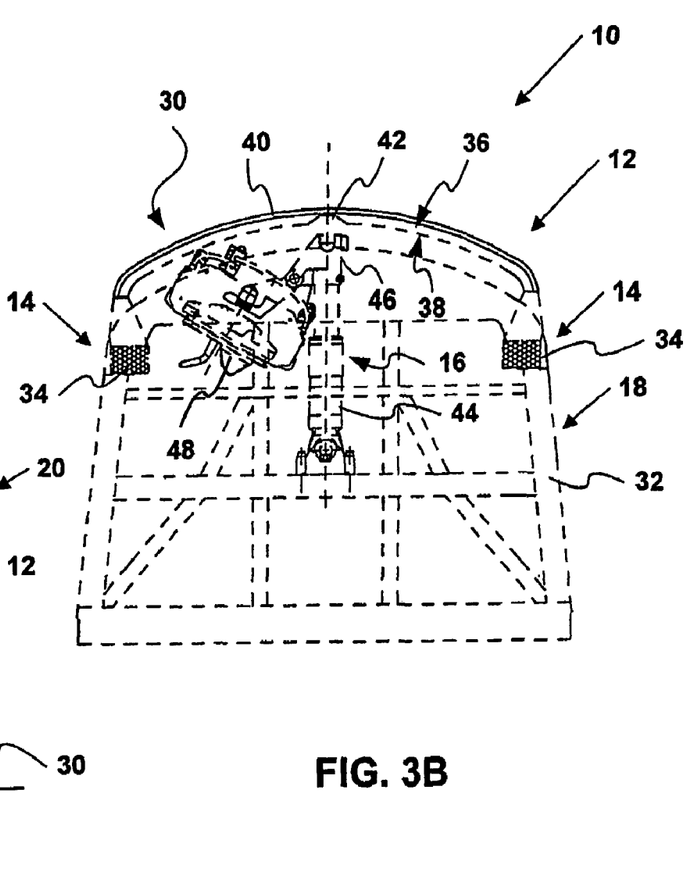

Referring now to the plan view of FIG. 3B, the cover structure 30 is configured for attachment to one end of the vehicle, and is designed to deform elastically when impact energy is exerted thereon. In the depicted embodiment, the cover structure 30 is attached indirectly to a frame 32 at the end of the vehicle, via a pair of low force energy absorption elements 34 that are disposed between the cover structure 30 and the frame 32. As explained below, the low force energy absorption elements 34 may comprise the second impact energy absorption zone 14 (FIG. 2). Note, however, that the attachment of the cover structure to the front portion of the vehicle can also be a direct attachment.

As mentioned above, the cover structure 30 is designed to engage pedestrians equal or greater in stature than a 5th percentile female 20 below their center of gravity, in order to prevent pedestrians from entering beneath the vehicle. In a preferred embodiment, the cover structure 30 is designed for absorbing a range of impact energy within the range assigned to the first zone 12, as shown in the table diagram of FIG. 1, as described above. As the cover structure 30 is designed to deform elastically, it provides for storing a part of any collision energy, spreading the load of the impact, and passing the load to the low force energy absorption elements 34.

In the depicted embodiment, the cover structure 30 is comprised of an elastic material having a low modulus of elasticity for reducing pedestrian collision forces. In one embodiment, the cover structure is formed of fiberglass. In another embodiment, it is made from plastic. The cover structure has an outer surface 36 and an inner surface 38, and in one embodiment the outer surface 36 of the cover structure is at least partially covered by a foam mat 40 to provide the low modulus of elasticity. The inner surface 38 of the cover structure 30 has a preformed detent 42 formed therein, the purpose of which is explained below. In one embodiment, the cover structure 30 has a rounded geometry that provides for deflecting pedestrians away to the side of the vehicle, and keeping them from being crushed underneath the vehicle in the event of a collision.

FIG. 3B also affords a view of the third impact energy zone 16, which may be implemented by a folding coupler mechanism including a shank 44 having a proximate end configured for attachment to the frame 32. The folding coupler mechanism also includes a coupling head 48 pivotally attached to a distal end of the shank for pivoting between an extended position and a stowed position (as shown). The shank is designed to absorb energy upon impact of the vehicle with an object much larger than the pedestrian shown in FIG. 3A. The distal end of the shank is designed to move into the preformed detent 42 in the inner surface of the cover structure in the event of a high impact energy collision when the head is in the stowed position. As described in detail below, the engagement of the distal end of the shank into the preformed detent 42 provides important advantages over prior art impact energy management systems.

The front end of the light rail vehicle can be set to two configurations. The first configuration is as a leading cab, wherein the coupling head 48 is folded and stowed and the cover structure 30 is lowered across the front of the vehicle. The second configuration is with the cover structure 30 raised, and the coupling head 48 extended and engaged with another vehicle's coupling mechanism. In the second configuration, the vehicle can be joined with other vehicles, and the vehicle functions conventionally in a standard fashion known in the industry.

The first configuration—with the cover structure 30 lowered—is the one of interest to the present invention. As described above, the integrated impact energy management system 10 provides five energy absorption zones with the cover structure 30 lowered, and the coupling head 48 folded and stowed. The first three zones 12, 14 and 16 are designed to minimize harmful peak decelerations. As described below, the last two zones 18 and 20 are designed to minimize catastrophic penetration or crushing of the cab and passenger area of the vehicle.

Figure 4A:
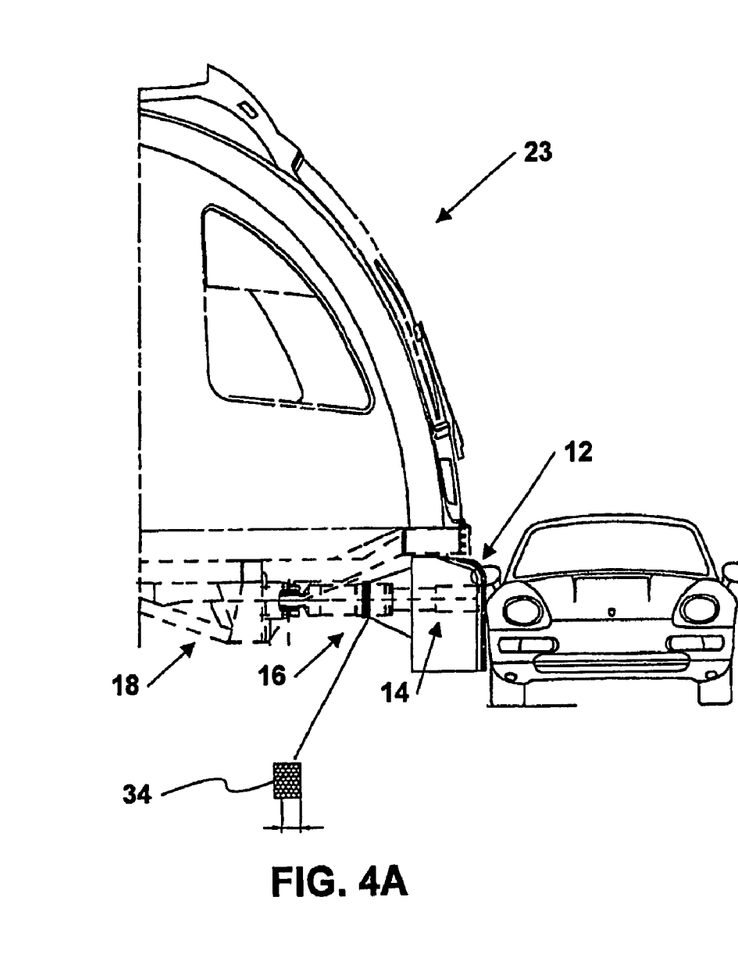
FIGS. 4A and 4B are cross sectional views of a second impact energy absorption zone of a system in accordance with one embodiment of the present invention.
Figure 4B:
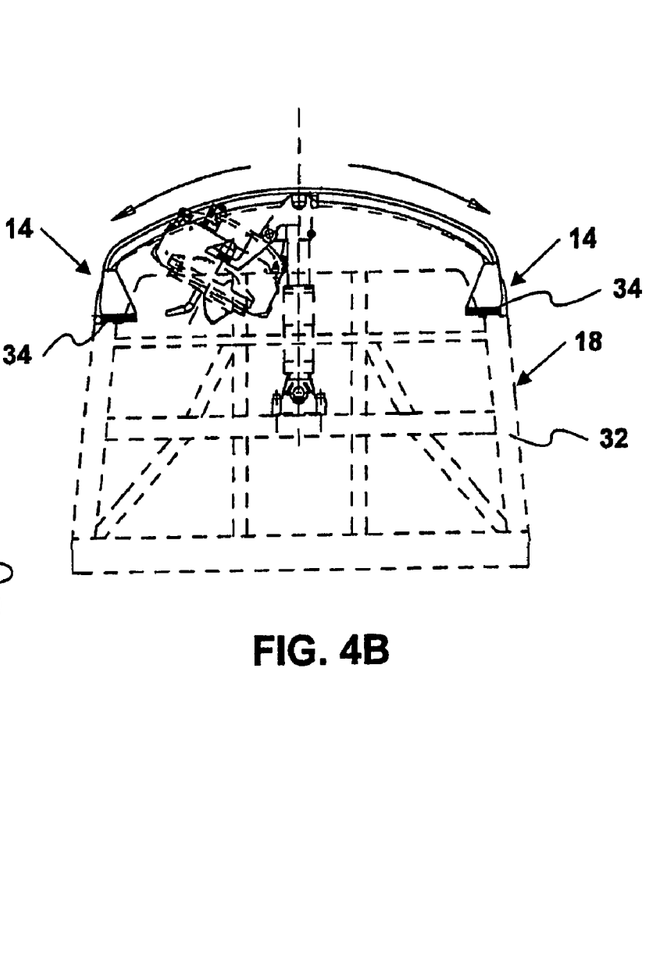

FIG. 4A shows a side cross-sectional view of an embodiment of the integrated impact energy management system 10 attached to a vehicle 23 immediately before collision with an automobile, which typically weighs between one and three tons. Referring to the plan view of FIG. 4B, the second impact energy absorption zone 14 is designed to mitigate the consequences of collisions with the automobile. In the depicted embodiment, the second impact energy absorption zone 14 is comprised of a pair of low force energy absorption elements 34 disposed between the cover structure 30 and the frame 32. These elements may be regenerative or non-regenerative in nature. The characteristics of the energy absorption elements are selected to avoid excessive acceleration forces on the automobile and its passengers. In one embodiment, the low force energy absorption elements 34 may comprise plastic deformation tubes. In an alternative embodiment, the energy absorption elements 34 are formed from a non-regenerative honeycomb material. In yet another embodiment, the elements 34 may be implemented by regenerative gas-hydraulic struts.

In a preferred embodiment, the low force energy absorption elements 34 are designed for absorbing a range of impact energy within the impact energy range assigned to the second zone 14, as shown in the table diagram of FIG. 1, as described above. Note that in this embodiment, the low force energy absorption elements 34 provide 100 mm of travel or deflection upon consumption of the total impact energy absorption capacity of the elements. The range of travel of the low force energy absorption elements 34 dictates the travel of the cover structure 30 across the first and second impact energy absorption zones 12.

Figure 5A:
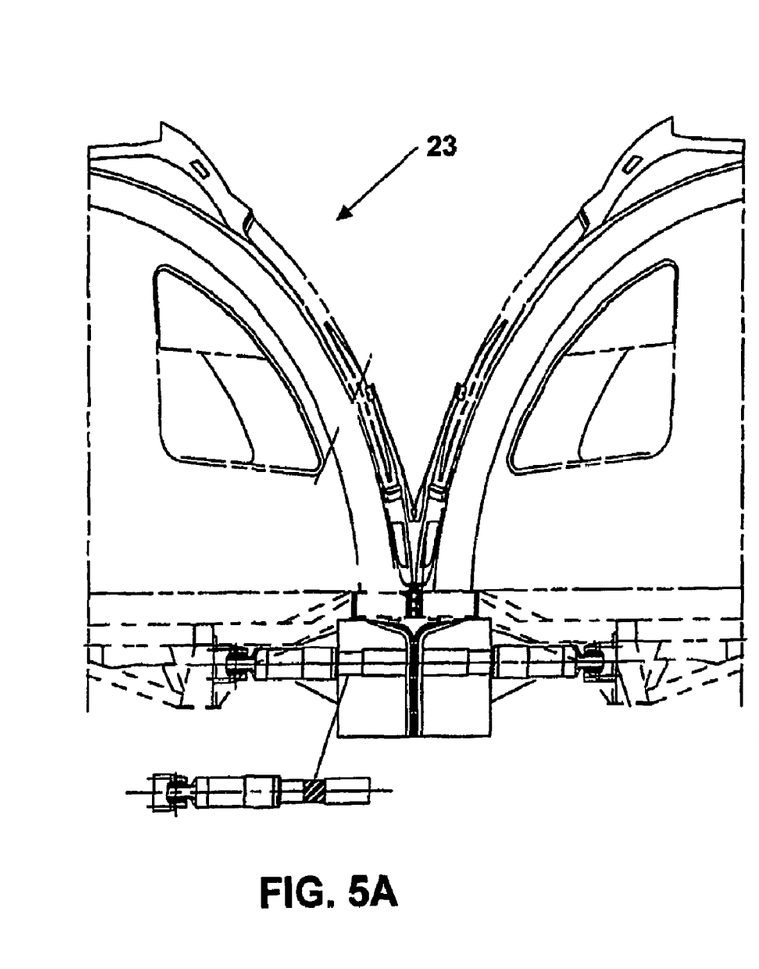
FIGS. 5A and 5B are cross sectional views of a third impact energy absorption zone of a system in accordance with one embodiment of the present invention.

FIG. 5A shows a side cross-sectional view of an embodiment of the integrated impact energy management system 10 attached to a vehicle 23 immediately before a collision with another light rail vehicle, which typically weighs about 40 tons. Referring to the plan view of FIG. 5B, the third impact energy absorption zone 16 is designed to mitigate the consequences of collisions with another light rail vehicle. In the depicted embodiment, the third impact energy absorption zone 16 includes a folding coupler mechanism 60 including a shank 44 having a proximate end 62 configured for attachment to the frame 32. The shank has a longitudinal axis that extends from the proximate end to a distal end 64 in a direction parallel to a longitudinal axis of the vehicle. The shank also has an energy absorption element 66 for absorbing energy caused by compressive forces exerted along the longitudinal axis of the shank 44 upon impact of the vehicle with another rail vehicle. The coupler mechanism 60 also includes the coupling head 48 pivotally attached to the distal end 64 of the shank for pivoting between an extended position and a stowed position (as shown). The distal end 64 of the shank is designed to fit into the preformed detent 38 in the cover structure upon exertion of impact energy sufficient to cause the second energy absorption elements 34 to travel or deflect over their maximum distances, which dictates at least part of the travel of the cover structure 30 toward the front portion of the vehicle upon collision.

Figure 5B:
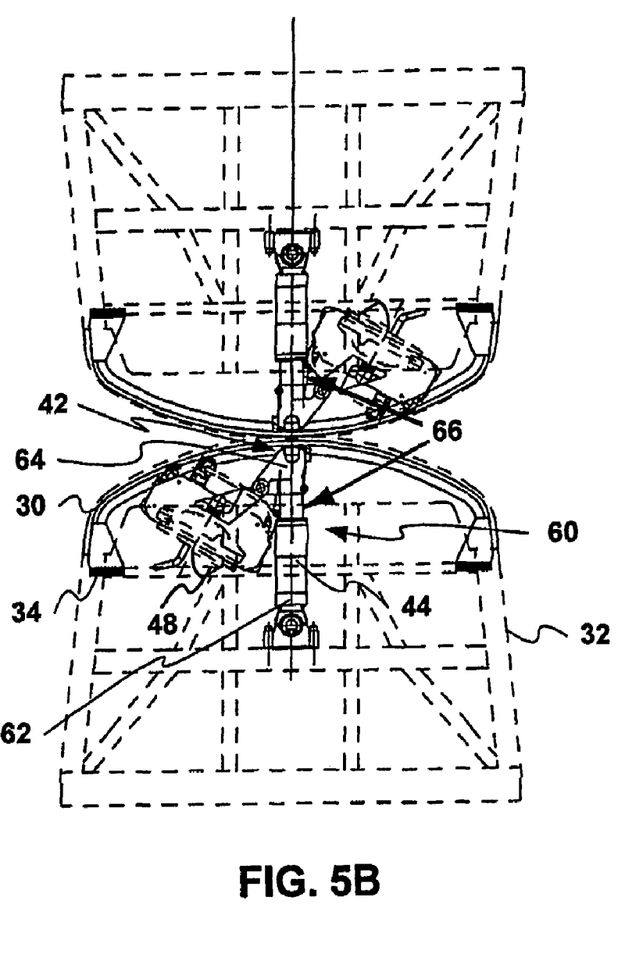

When the cover structure 30 is lowered and the coupler mechanism 60 is folded and stowed, the energy absorption element 66 of the coupler mechanism 60 remains co-axial with the longitudinal axis of the vehicle. Once the cover structure 30 has consumed the energy of the first and second energy absorption zones, the energy absorption element 66 of the coupler mechanism 60 is engaged. The energy absorption element 66 mitigates the consequences of collisions of the light rail vehicle with a heavy truck or another light rail vehicle. In one embodiment, the energy absorption by the energy absorption element 66 is regenerative.

As mentioned above, the distal end of the shank is designed to move into the preformed detent 42 in the inner surface of the cover structure 30 in the event of a collision after consumption of the energy absorbing capacity of the first and second energy absorption zones. The engagement of the distal end of the shank into the preformed detent 42 provides important advantages over prior art impact energy management systems, which do not include a preformed detent in the inner surface of a cover structure. The preformed detent 42 provides added stability of the shank in resistance to lateral forces exerted during a collision.

In a preferred embodiment, the energy absorption element 66 of the coupler mechanism 60 is designed for absorbing a range of impact energy within the range assigned to the third zone 16, as shown in the table diagram of FIG. 1, as described above. Note that in this embodiment, the energy absorption element 66 of the coupler mechanism provides 165 mm of travel or deflection upon consumption of its total impact energy absorption capacity.

Figures 6A, 6B, 6C, 6D:
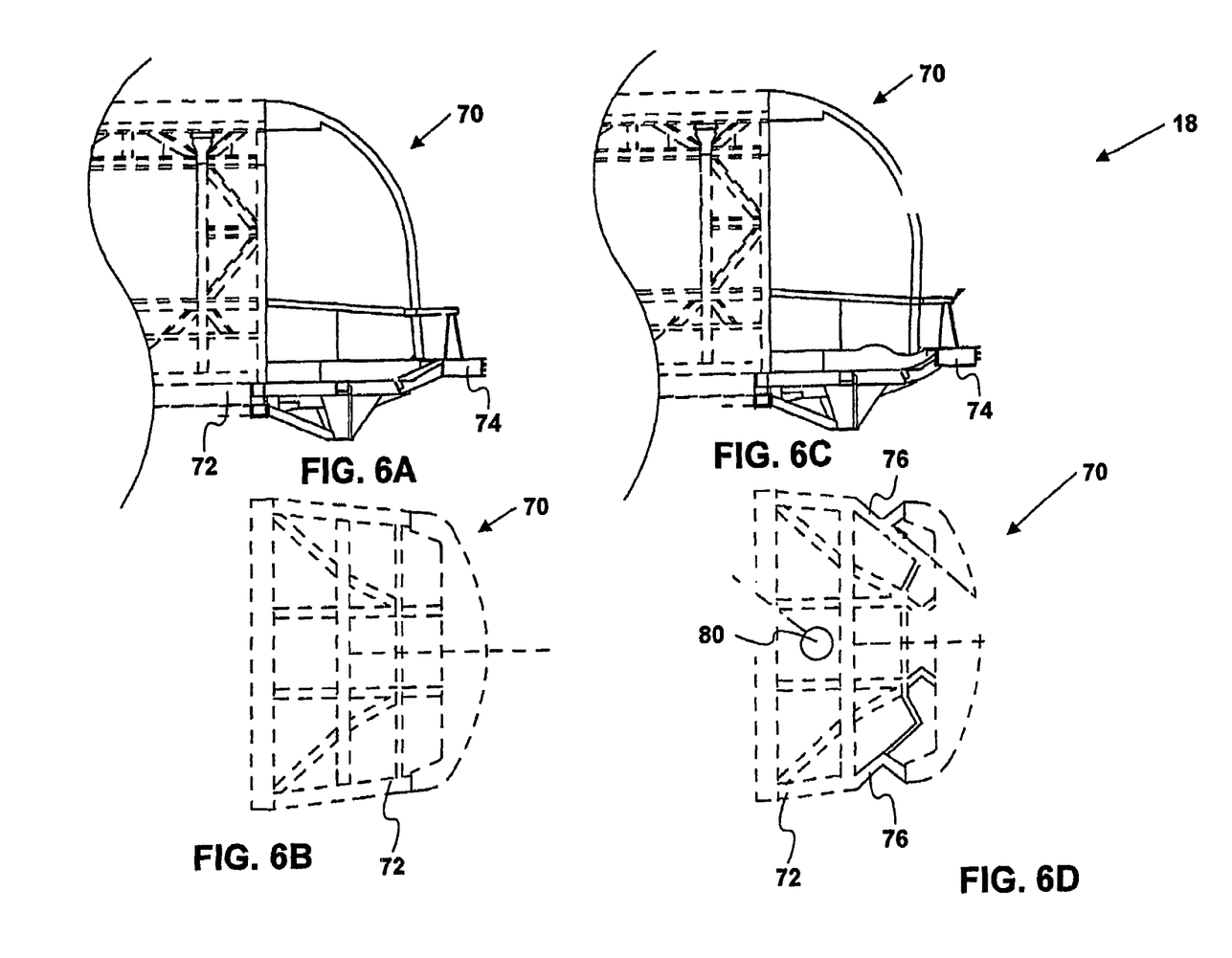
FIG. 6A and 6B are cross sectional views of a fourth impact energy absorption zone of a system in accordance with one embodiment of the present invention, prior to a severe collision.
FIG. 6C and 6D are cross sectional views of the fourth impact energy absorption zone after a severe collision.

FIGS. 6A and 6B show side cross-sectional and plan views of the fourth impact energy absorption zone 18 (FIG. 2) in accordance with one embodiment of the present invention, prior to a severe collision. In this embodiment, the fourth impact energy absorption zone 18 is formed by a driver cab structure 70 at a front end of a light rail vehicle. The driver cab structure 70 includes a collapsible under-frame 72, fitted with anti-climbers 74 as will be understood by those of ordinary skill in the art. In the event of a rail vehicle to rail vehicle collision severe enough to consume all the energy of the first three zones 12, 14 and 16 (FIG. 2), the anti-climbers 74 at the end of the vehicle under-frame 72 will engage, and further impact energy will then be absorbed by the driver cab structure 70, and particularly the collapsible under-frame 72. In a preferred embodiment, the force required to begin this impact energy absorption is equal to the empty weight of the vehicle, which is typically about 40 tons. FIGS. 6C and 6D show side cross-sectional and plan views of the fourth impact energy absorption zone 18 after a severe collision with another rail vehicle resulting in at least partial collapse of the driver cab structure 70 and under-frame 72. FIG. 6D shows collapsed portions 76 of the under-frame 72. Still referring to FIG. 6D, in a preferred embodiment, the cab structure 70 is designed to allow a protective pocket 80 to remain for the vehicle driver. In a preferred embodiment, the collapsible cab structure is designed to absorb a range of impact energy within the range assigned to the fourth zone 18, as shown in the table diagram of FIG. 1, and as described above. Note that in this embodiment, the collapsible cab structure provides 460 mm of travel or deflection upon consumption of its total impact energy absorption capacity.

Figure 7:
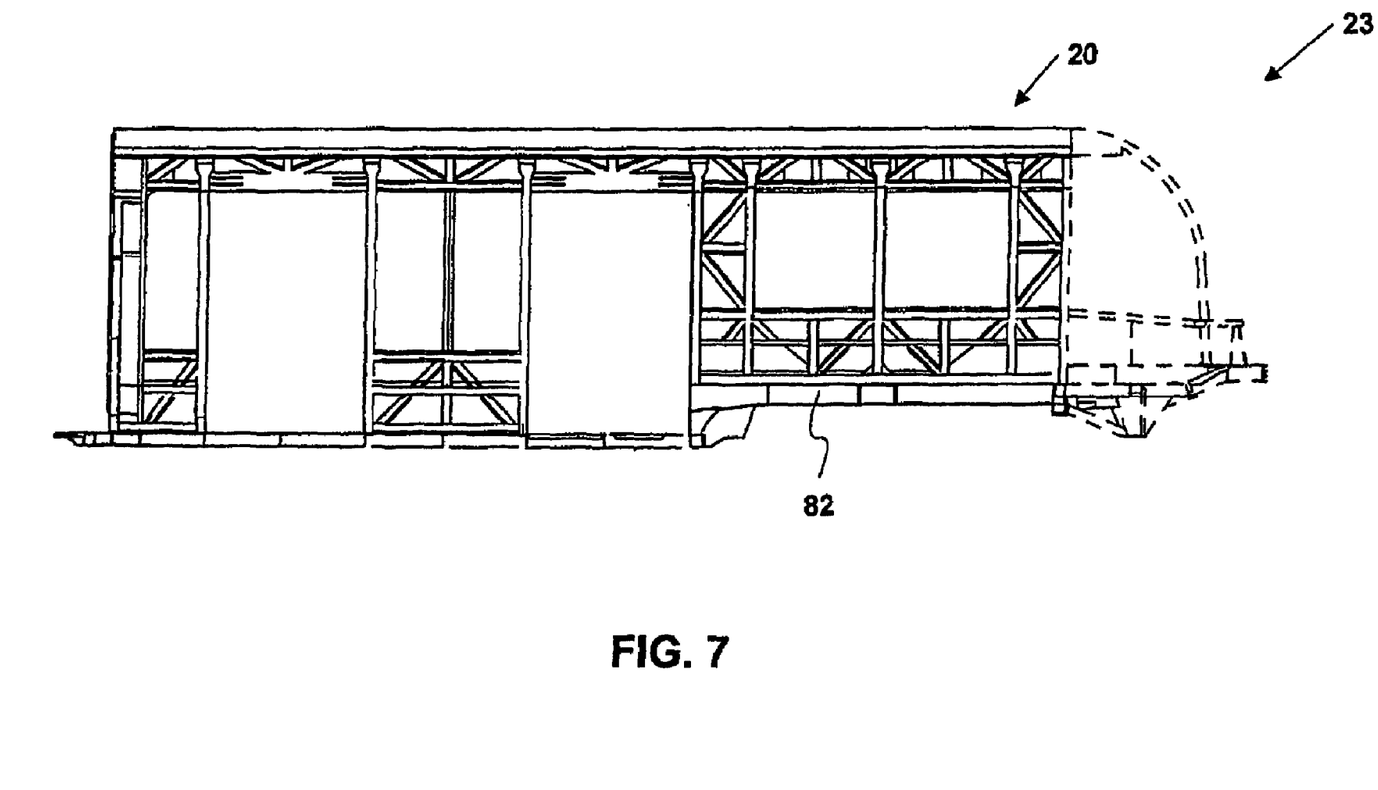
FIG. 7 is a cross sectional view of a fifth impact energy absorption zone of the system of FIG. 2 in accordance with one embodiment of the present invention.

FIG. 7 shows a side cross sectional view of the fifth impact energy absorption zone 20 (FIG. 2) in accordance with one embodiment of the present invention. In the depicted embodiment, the fifth zone 20 is provided by a protective cage 80 surrounding the passenger area of the light rail vehicle. The protective cage 80 around the passenger area is the strongest portion of the vehicle. Able to withstand end loads of twice the vehicle empty weight, it is intended to create a protective cage around the passengers of the light rail vehicle. In the event of a high-energy collision, the protective cage 80 is intended to resist crushing loads or penetration of objects into the passenger area.

In sum, although the present invention has been described in considerable detail with reference to certain preferred versions thereof, other versions are possible. For example, the integrated impact energy management system of the present invention need not be implemented with five zones, as described in the preferred embodiment. Any other number of zones is contemplated. Therefore, the spirit and scope of the appended claims should not be limited to the description of the preferred versions contained herein.

What is claimed is:

1. A system for managing a wide range of impact energies exerted upon impact of a vehicle with an object, comprising:
   a cover structure adapted for attachment to a vehicle, the cover structure being designed to deform elastically when impact energy is exerted thereon, and having an inner surface designed to face the vehicle, the inner surface having a preformed detent; and
   a folding coupler mechanism including a shank having a proximate end adapted to attach to the vehicle, and a longitudinal axis that extends from the proximate end to a distal end in a direction substantially parallel to a longitudinal axis of the vehicle, the shank having an energy absorption element for absorbing energy caused by compressive forces exerted along the longitudinal axis of the shank, the mechanism also including a coupling head pivotally attached to the distal end of the shank for pivoting between an extended position and a stowed position, wherein the distal end of the shank moves into the preformed detent in the cover structure upon consumption of the energy absorbing capacity of the cover structure when the coupling head is in the stowed position.

2. A system as recited in claim 1, wherein the cover structure includes an elastic covering having a low modulus of elasticity.

3. A system as recited in claim 1, wherein the cover structure includes a foam mat.

4. A system as recited in claim 1, wherein the attachment of the cover structure to the front portion of the vehicle is a direct attachment.

5. A system as recited in claim 1, further comprising at least one low force energy absorption element disposed between the cover structure and one end of the vehicle, wherein the distal end of the shank moves into the preformed detent in the cover structure upon consumption of the energy absorbing capacities of the cover structure and the low force energy absorption element.

6. A system as recited in claim 5, wherein the low force energy absorption element is regenerative.

7. A system as recited in claim 1, wherein the energy absorption element of the shank is regenerative.

8. A system as recited in claim 1, wherein the vehicle is a light rail vehicle having a cab structure proximate the end of the vehicle, the cab structure being designed to collapse upon exertion of a sufficient impact force.

9. A system as recited in claim 8, wherein the vehicle further comprises a rigid passenger area structure.

10. A light rail vehicle having an integrated impact energy management system for managing a wide range of impact energies exerted upon impact of the vehicle with an object, the impact energy management system comprising:
    a cover structure designed to deform elastically upon impact of the vehicle with an object, the cover structure having an inner surface with a preformed detent; and
    a shank having a proximate end attached to the vehicle, and a longitudinal axis extending to a distal end in a direction substantially parallel to a longitudinal axis of the vehicle, the shank having an energy absorption element for absorbing energy caused by compressive forces exerted along the longitudinal axis of the shank, wherein the distal end of the shank moves into the preformed detent in the cover structure upon consumption of the energy absorbing capacity of the cover structure;

a coupling head pivotally attached to the distal end of the shank and configured for movement between an extended position and a stowed position, wherein the distal end of the shank is configured to move into the preformed detent in the cover structure upon consumption of the energy absorbing capacity of the cover structure when the coupling head is in the stowed position.

11. A light rail vehicle as recited in claim 10, wherein the cover structure includes an elastic covering having a low modulus of elasticity.

12. A light rail vehicle as recited in claim 10, wherein the cover structure includes a foam mat.

13. A light rail vehicle as recited in claim 10, wherein the attachment of the cover structure to the front portion of the vehicle is a direct attachment.

14. A light rail vehicle as recited in claim 10, further comprising at least one low force energy absorption element disposed between the cover structure and one end of the vehicle, wherein the distal end of the shank moves into the preformed detent in the cover structure upon consumption of the energy absorbing capacities of the cover structure and the low force energy absorption element.

15. A light rail vehicle as recited in claim 14, wherein the low force energy absorption element is regenerative.

16. A light rail vehicle as recited in claim 10, wherein the energy absorption element of the shank is regenerative.

17. A light rail vehicle as recited in claim 10, wherein the vehicle is a light rail vehicle having a cab structure proximate one end of the vehicle, the cab structure being designed to collapse upon exertion of a sufficient impact force.

18. A light rail vehicle as recited in claim 17, wherein the driver cab structure includes a collapsible under-frame, fitted with anti-climbers.

19. A light rail vehicle as recited in claim 10, wherein the vehicle further comprises a rigid passenger area structure.

20. A light rail vehicle having an integrated impact energy management system for managing a wide range of impact energies exerted upon impact of the vehicle with an object, the impact energy management system comprising:

a cover structure designed to deform elastically upon impact of the vehicle with an object, the cover structure having an inner surface with a preformed detent;

a shank having a proximate end attached to the vehicle, and a longitudinal axis extending to a distal end in a direction substantially parallel to a longitudinal axis of the vehicle, the shank having an energy absorption element for absorbing energy caused by compressive forces exerted along the longitudinal axis of the shank, wherein the distal end of the shank moves into the preformed detent in the cover structure upon consumption of the energy absorbing capacity of the cover structure; and a coupling head pivotally attached to the distal end of the shank for pivoting between an extended position and a stowed position and wherein the distal end of the shank moves into the preformed detent upon a high energy impact when the coupling head is in the stowed position.

* * * * *

UNITED STATES PATENT AND TRADEMARK OFFICE
CERTIFICATE OF CORRECTION

PATENT NO. : 7,597,051 B2  Page 1 of 1
APPLICATION NO. : 10/572124
DATED : October 6, 2009
INVENTOR(S) : Glenn Gough It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 414 days.

Signed and Sealed this

Twenty-eighth Day of September, 2010

David J. Kappos
*Director of the United States Patent and Trademark Office*